July 31, 1962 F. P. SHARPE 3,046,643
STUD INSERTING MACHINE
Original Filed April 8, 1957 6 Sheets-Sheet 2

INVENTOR.
FREDERICK P. SHARPE
BY
Whittemore, Hulbert & Belknap
ATTORNEYS

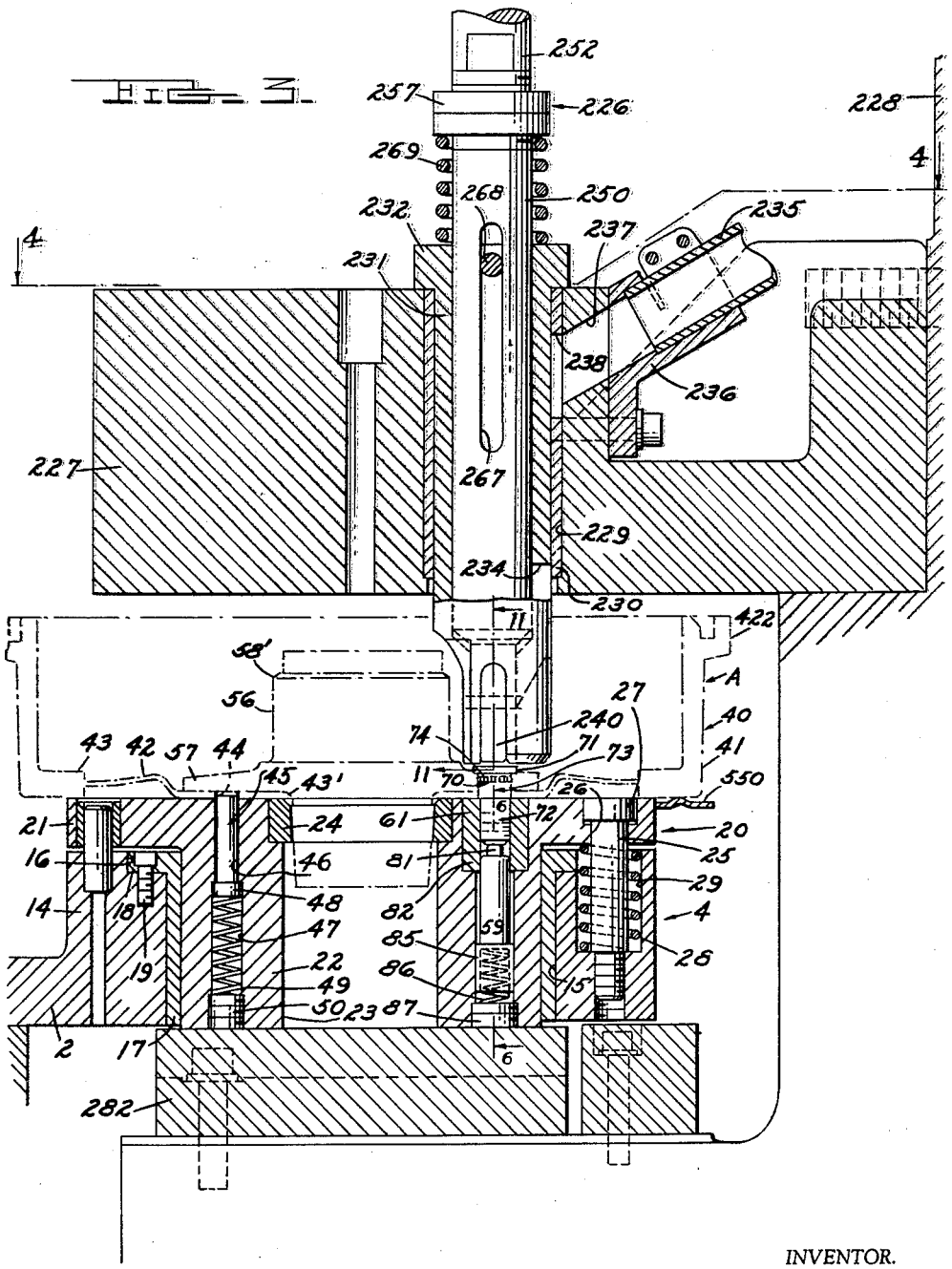

July 31, 1962 F. P. SHARPE 3,046,643
STUD INSERTING MACHINE
Original Filed April 8, 1957 6 Sheets-Sheet 4
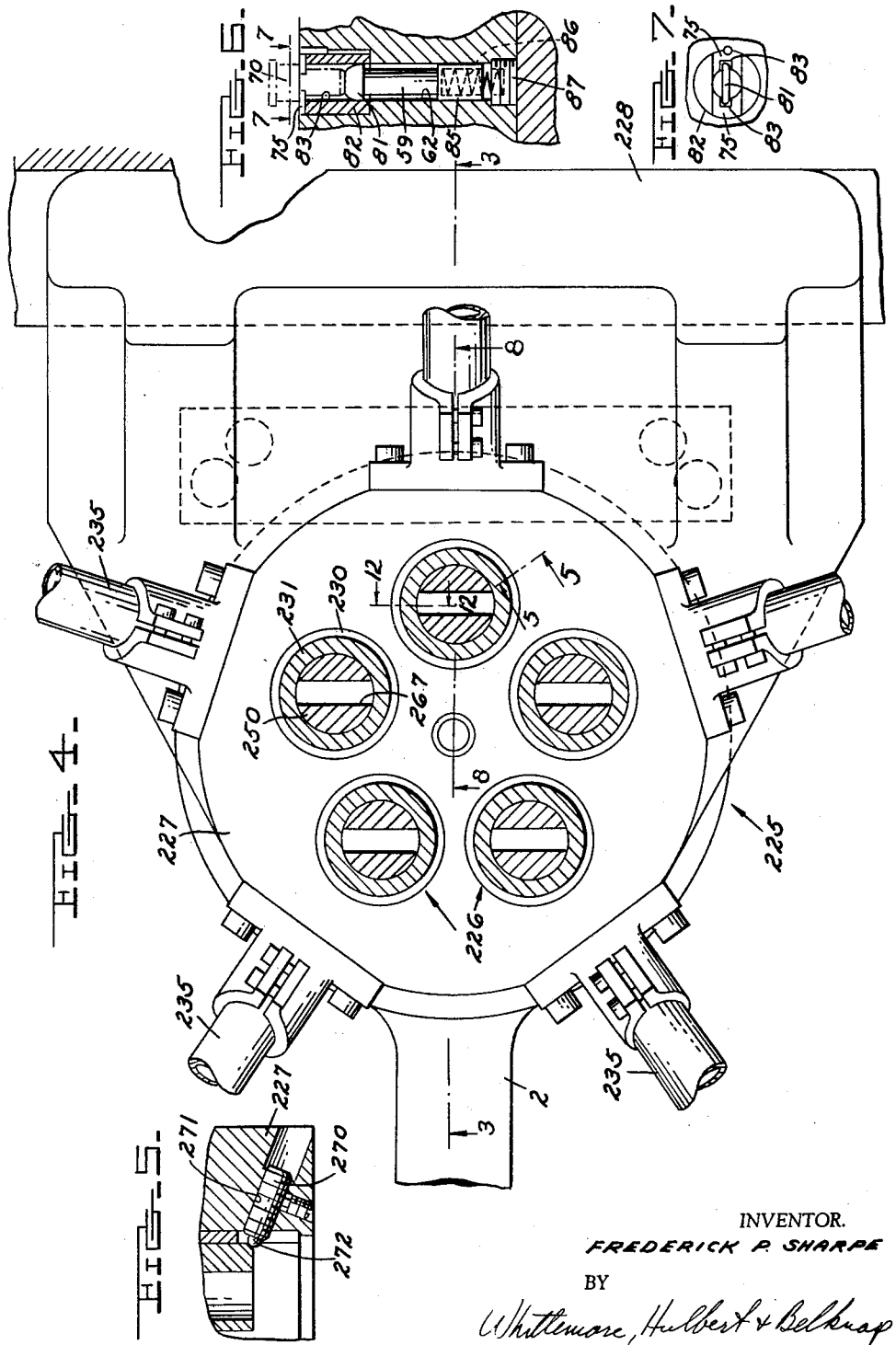
INVENTOR.
FREDERICK P. SHARPE
BY
Whittemore, Hulbert & Belknap
ATTORNEYS

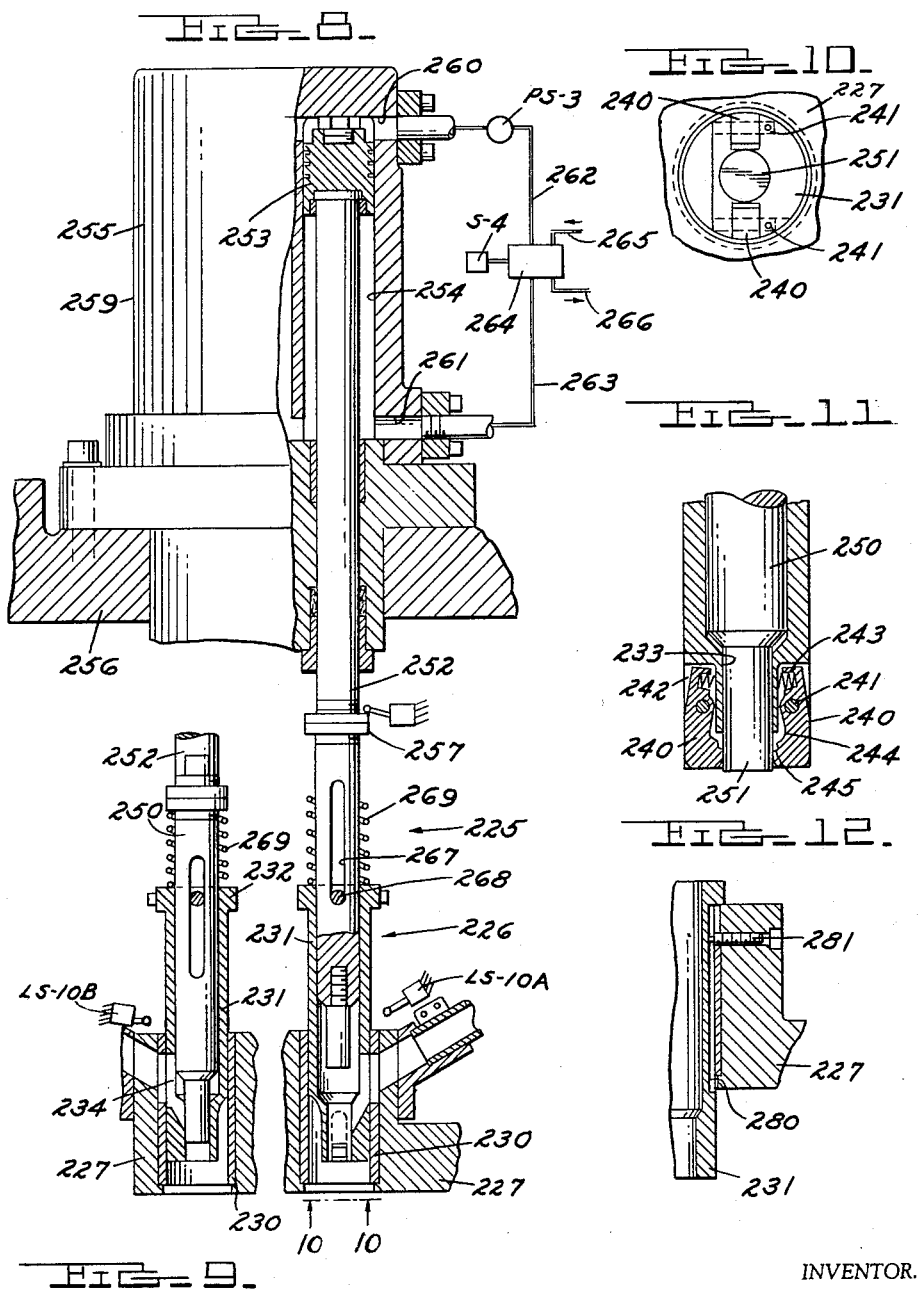

July 31, 1962 F. P. SHARPE 3,046,643
STUD INSERTING MACHINE
Original Filed April 8, 1957 6 Sheets-Sheet 6
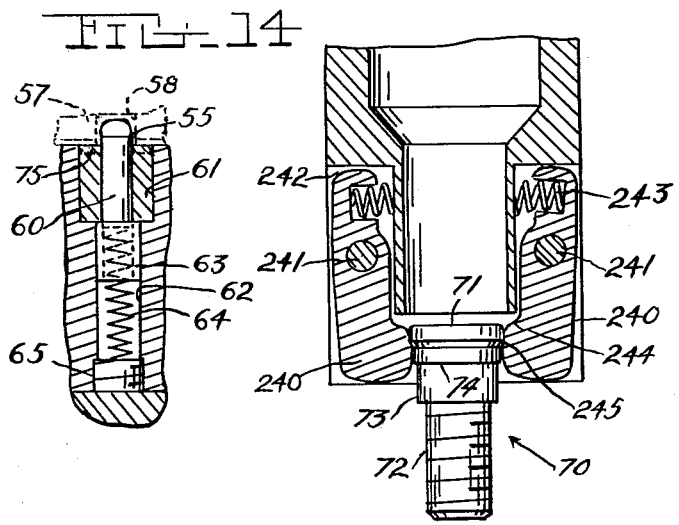
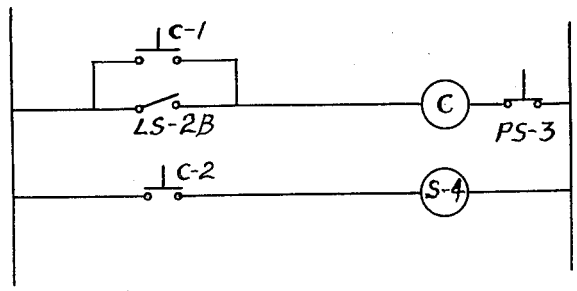
INVENTOR.
FREDERICK P. SHARPE
BY
*Whittemore, Hulbert & Belknap*
ATTORNEYS

United States Patent Office 3,046,643
Patented July 31, 1962

3,046,643
STUD INSERTING MACHINE
Frederick P. Sharpe, Dearborn, Mich., assignor to Kelsey-Hayes Company, Detroit, Mich., a corporation of Delaware
Original application Apr. 8, 1957, Ser. No. 651,209, now Patent No. 2,983,999, dated May 16, 1961. Divided and this application Mar. 16, 1959, Ser. No. 799,607
8 Claims. (Cl. 29—208)

The present invention relates to a stud inserting machine and refers more particularly to a machine for simultaneously assembling a plurality of studs with a wheel hub and brake drum to secure them together.

In keeping with the present trend toward automation in manufacturing, apparatus has been developed which secures wheel hubs and brake drums together in assembly with a plurality of studs, inserts tapered wheel bearings into both sides of the wheel hubs, and unloads the assembled article of manufacture in a desired manner. Such apparatus is disclosed in applicant's co-pending application, Serial Number 651,209, filed April 8, 1957, now Patent No. 2,983,999, granted May 16, 1961, of which application the present application is a division. In such apparatus it is desirable that a plurality of studs be automatically inserted simultaneously into prepared aligned orifices in the wheel hubs and brake drums.

It is therefore one of the objects of this invention to provide a machine for automatically inserting a plurality of studs into prepared aligned orifices in a wheel hub and brake drum.

It is another object to provide a machine to automatically secure a brake drum and wheel hub in unitary assembly with a plurality of studs.

More specifically it is an object to provide a machine for inserting a stud in a hole in a workpiece, including a yieldable support for holding said workpiece, and a member movable toward the workpiece to insert a stud in said hole therein under sufficient pressure to cause the yieldable support to assume a rigid position against positive abutting means.

Still more specifically it is an object to provide a machine for inserting studs in holes in a workpiece, including a vertically movable support for said workpiece resiliently held in a predetermined position over a fixed anvil and members movable toward said workpiece to insert studs in said holes therein under sufficient pressure to cause said support to move vertically into a position abutting said anvil.

With these and other objects in view, the invention resides in the novel features of construction and combination of parts as more fully hereinafter set forth.

In the drawings:

FIGURE 3 is a sectional view of a stud inserting machine as shown in FIGURES 1 and 2 taken on the line 3—3 of FIGURE 4.

FIGURE 4 is a sectional view taken on the line 4—4 of FIGURE 3.

FIGURE 5 is a sectional view showing the means for holding up the stud holder, and taken on line 5—5 of FIGURE 4.

FIGURE 6 is a sectional view taken along the line 6—6 of FIGURE 3.

FIGURE 7 is a view taken along the line 7—7 of FIGURE 6.

FIGURE 8 is a sectional view taken along the line 8—8 of FIGURE 4.

FIGURE 9 is a fragmentary view of portions of FIGURE 8, showing the parts in another position.

FIGURE 10 is a view taken along the line 10—10 of FIGURE 8.

FIGURE 11 is a sectional view taken along the line 11—11 of FIGURE 3.

FIGURE 12 is a sectional view taken on the line 12—12 of FIGURE 4.

FIGURE 13 is similar to FIGURE 11 but shows a stud supported in the stud holder.

FIGURE 14 is a section view similar to FIGURE 6 showing a second type of pin used in the support member.

FIGURE 15 is a schematic representation of the control system of the stud inserting machine illustrated in FIGURES 1–14.

Figure 1:
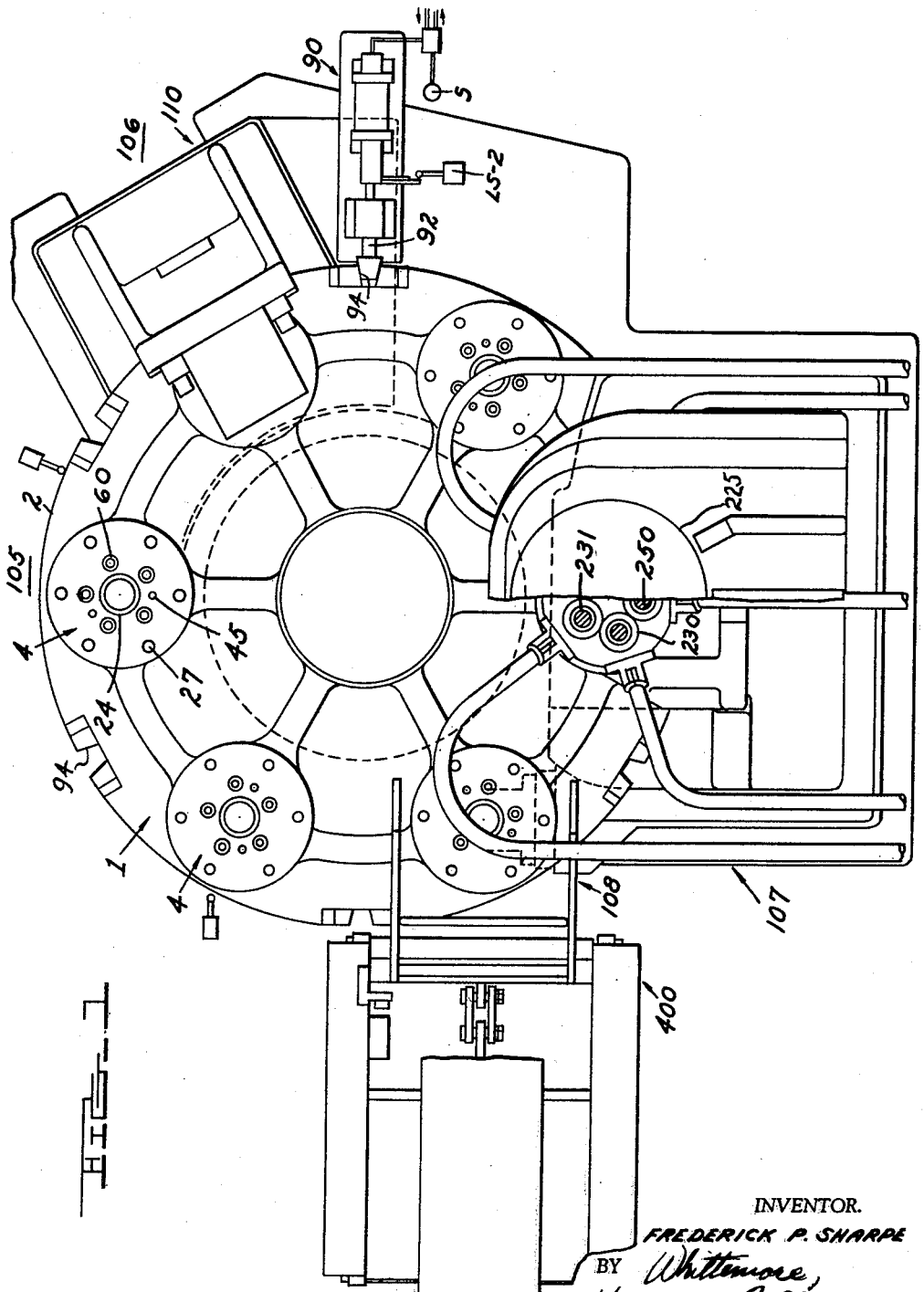
FIGURE 1 is a plan view of apparatus for the assembly of wheel hubs, brake drums, studs and bearing cups showing the relation of a stud inserting machine according to the invention to the total apparatus.
Figure 2:
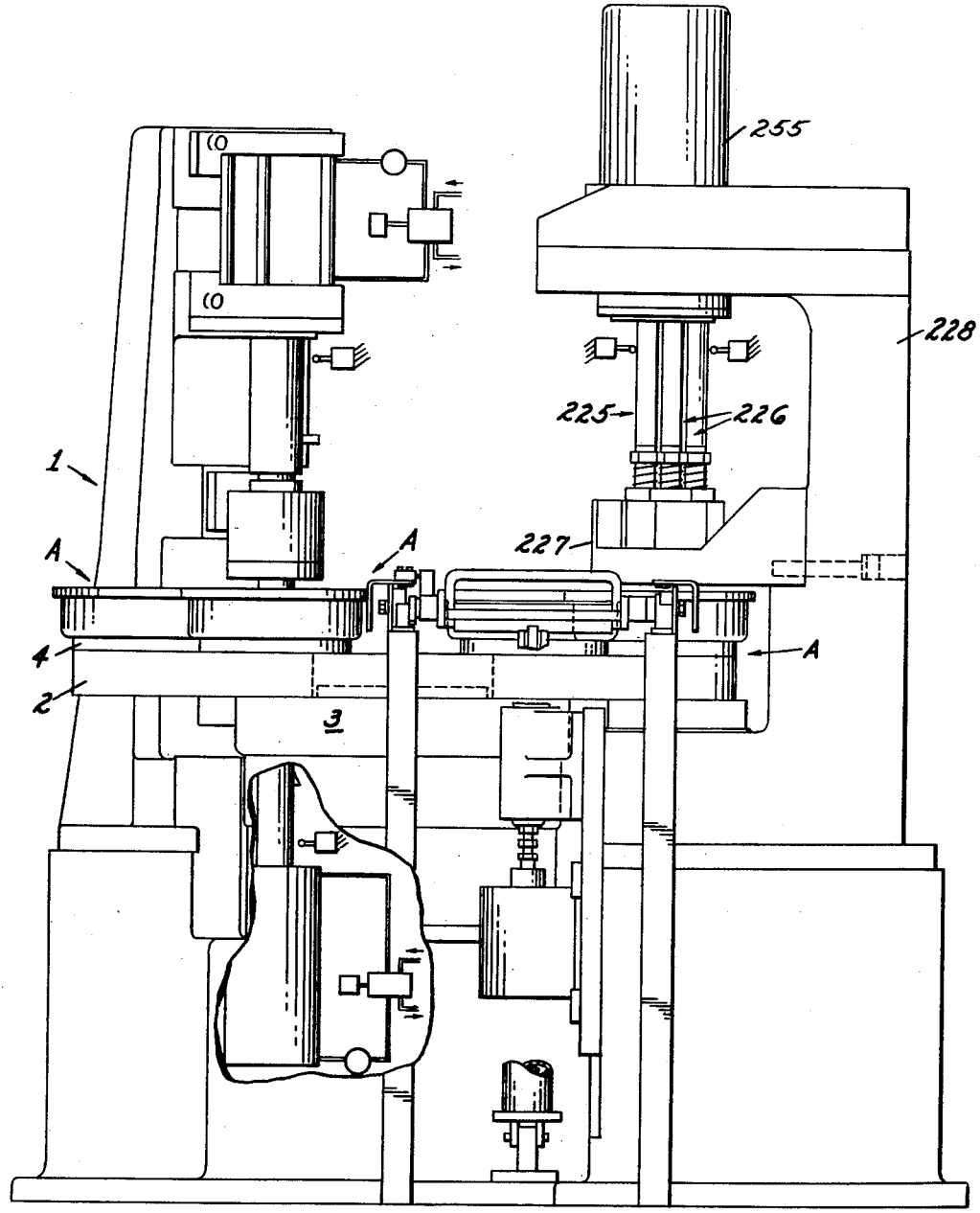
FIGURE 2 is a side elevation of the apparatus illustrated in FIGURE 1.

Referring more particularly to the drawings, apparatus for the assembly of wheel hubs, brake drums, studs and bearing cups is shown generally at 1 in FIGURES 1 and 2. The apparatus comprises a rotatable generally horizontally disposed turntable 2 supported for rotation on the frame structure 3. Six equally spaced supports 4 for brake drum and hub assemblies according to the invention are provided around the periphery of table 2. A loading station 105 for brake drums and hubs, a bearing cup inserting machine 110 at station 106, locking mechanism 90, stud inserting mechanism 225 according to the invention at station 107, and an unloading mechanism 400 at station 108 are also provided around the periphery of table 2 as shown in the complete apparatus.

The stud inserting machine of the invention includes one of supports 4 and stud inserting mechanism 225. Each support 4 on the turntable comprises the integral circular enlargement 14 which projects upwardly from the turntable (FIGURE 3). Each enlargement 14 has a central passage 15 which extends vertically therethrough from the top of the enlargement to the bottom of the turntable, the passage being counterbored at the upper end as shown at 16. A tubular bushing 17 is supported in the passage 15 and has a flange 18 at the upper end disposed in the counterbored portion 16 of the passage and secured to the enlargement 14 by the fasteners 19. Each support 4 also includes a supporting member 20 having an upper circular portion 21 and a depending circular portion 22 of reduced diameter received in the tubular bushing 17 for vertical reciprocation therein. The supporting member 20 has the central vertical through passage 23 counterbored at the upper end to receive the supporting ring 24.

Each supporting member 20 is mounted on the enlargement 14 by an annular series of bolts 25. The shanks of the bolts threadedly engage the enlargement 14 so that the bolts are rigidly secured in position on the enlargements, and the upper ends of the bolts are slidably received in passages 26 in the supporting member 20. These passages 26 are counterbored at the upper end to slidably receive the enlarged heads 27 of the bolts. Coil springs 28 encircle each bolt shank and are disposed in recesses 29 in the enlargements 14 through which the bolt shanks extend, the springs being compressed between the bottoms of the recesses and the undersides of the circular portions 21 of the supporting members 20, normally urging the supporting members upwardly to a position in which the counterbored portions of passages 26 engage the undersides of the bolt heads 27. In FIGURE 3 the supporting members 20 are shown pressed downwardly from the upper limiting position against the action of the springs 28.

The brake drum 40 of each hug and drum assembly A has the cast annular brake flange 41 and the sheet metal web or back 42, the annular periphery of which is cast into the inturned portion 43 of the brake flange. The drum back 42 has a central opening 43' of approximately the same diameter as the inside of supporting ring 24, and is also formed with a pair of apertures 44, one of which is shown in FIGURE 3. The apertures 44 are spaced from each other angularly with respect to the drum back and on a circle concentric with the brake flange.

The supporting member 20 has a pair of pins 45 which extend within vertical passages 46 in the supporting member 20. The pins 45 are slidable within passages 46, and the passages have enlarged lower portions 47 slidably receiving the heads 48 of the pins. A coil spring 49 is within the enlarged portion 47 of each passage to urge the associated pin upwardly to the position illustrated in FIGURE 3 in which the head 48 of the pin abuts the shoulder separating the enlarged lower portion 47 from the upper portion of the passage 46 and in which the upper end of the pin extends above the supporting member to enter the registering aperture 44 in the drum back. The pins 45 are angularly spaced so as to correspond with the spacing between the apertures 44 and are of approximately the same diameter as the apertures 44 so as to angularly locate the brake drum on the supporting member 20. The springs 49 are compressed between the heads 48 of the pins and the plugs 50 which close the lower ends of the enlarged portions 47 of the passages.

Each drum back is also formed with a circular series of five apertures 55 which are spaced apart equal distances and which are located on the same circle as apertures 44. The apertures 55 are provided to receive the studs which secure the brake drum to the hub 56. The annular flange 57 of the hub is also provided with a circular series of apertures 58 located to register with the respective apertures 55 in the assembled relation of the hub and brake drum, and being of a very slightly smaller diameter than the apertures 55. The tubular portion 58' of the hub extends through the central aperture in the drum back in assembled relation.

The supporting member 20 of each support 4 is provided with a plurality of pins which are arranged in a circle in positions to register with the apertures 55 and 58 in the drum back and hub flange. Five such pins are provided and one of these pins, indicated at 59, is of a somewhat different construction from the others. The other four pins 60 are of identical construction, and one of the pins 60 is shown in FIGURE 14. Each pin 60 is cylindrical, has a tapered upper end and is supported for vertical sliding movement within a tubular bushing 61 located in the upper counterbored portion of a passage 62 in the supporting member. Each pin 60 has an enlargement 63 at the lower end which is hollow. A coil spring 64 extends within the recess in the hollow enlargement 63 through the open lower end thereof, being compressed between the closed upper end of the recess and the plug 65 which closes the bottom of passage 62. The spring 64 normally urges the pin 60 upwardly to the position illustrated in which the pin extends into the registering apertures 55 and 58. The pins 60 are primarily stud guides and serve to guide the stud shanks which are inserted into assembled relation with the hub and drum assembly. These pins are of somewhat less diameter than the registering apertures 55 and 58.

One of the assembling studs is indicated at 70 in FIGURES 3, 6 and 13. Each stud 70 comprises a head 71 and a threaded shank 72 of approximately the same diameter as the inside diameter of the tubular bushings 61 so that the stud shanks are closely guided by the bushings 61 as they are inserted in apertures 55 and 58. The portion 73 of the shank adjacent the head is enlarged, and has a knurled circular part 74. The enlarged portion 73 is of approximately the same diameter as the apertures 55 and 58, and the knurled portion 74 is of a slightly greater diameter than the apertures 58 so as to have a pressed fit with the apertures 58 when assembled with the hub and drum assembly. The upper end of each tubular bushing 61 is provided with diametrically opposite recesses 75 (FIGURE 14) to upset the metal of the enlargement 73 and stake the stud to the underside of the drum back.

The other stud guiding pin 59 is shown in FIGURES 3, 6 and 7 and differs from pins 60 in that at its upper end it has a narrow transversely elongated head 81 of a length greater than the diameter of the pin 59. The tubular bushing 82 differs from bushing 61 by being formed with diametrically opposite vertical slots 83 for receiving and guiding the ends of the head 81. The inside diameter of the tubular bushing is approximately the same as the diameter of pin 59 to slidably receive the latter and is also approximately the same in diameter as the shank of the studs to provide a guide for the studs as they are inserted into assembled relation with the hub flange and drum back. The length of the head 81 is slightly less than the diameter of the aperture 55 and approximately the same, although somewhat less than the diameter of the aperture 58 to enable the head to pass through aperture 55 and to fit closely within aperture 58 to angularly locate the hub. The hub is radially located by the supporting ring 24 which receives the tubular portion of the hub.

The pin 59 is like pins 60 in that it is provided with a recessed enlargement 85 at the lower end to receive the spring 86 compressed between the plug 87 closing the lower end of passage 62. The spring normally urges the pin 59 upwardly to a position in which its head extends within aperture 58.

The stud inserting mechanism 225 includes a plurality of stud inserting devices 226. Five stud inserting devices are provided respectively located directly above the five tubular sleeves 61 and 82 of a hub and drum assembly support 4 of the turntable 2 in any indexed position of the turntable 2 and also directly above the respective pairs of aligned apertures 55 and 58 in the hub and drum assemblies when supported on the turntable 2 as indicated in FIGURE 3. A guide block 227 is rigidly secured to a frame member 228. The guide block is formed with five vertically disposed cylindrical through passages 229 lined with sleeves 230. The passages 229 and hence the sleeves 230 are respectively axially aligned with the five sleeves 61 and 82 of the support directly therebeneath in any indexed position of the turntable. Each stud inserting device 226 includes a tubular holder 231, and the holders 231 are respectively received in the sleeves 230 for vertical reciprocation therein. The holders 231 have collars 232 at their upper ends for limiting the downward movement of the holders.

The internal diameter of each stud holder is reduced at the lower end as indicated at 233 (FIGURE 11), to approximately the diameter of the stud heads or slightly larger, to receive the studs. Also, each stud holder has a lateral port 234 for admitting a stud. The studs are admitted to the stud holder by the stud chutes 235 respectively associated with the five stud inserting devices 226. These chutes are downwardly inclined toward their discharge ends and are secured to the tubular brackets 236 secured to the guide block 227. The studs in the stud chutes may pass by gravity from the discharge end of the chutes 235 into the inclined tubular brackets 236 and from there into the respective stud holders through the inclined passages 237 in the guide block and the opening 238 in the associated sleeve 230. The studs are adapted to travel downwardly in the chutes shank end first so as to enter the reduced lower end portions of the stud holders with the shank down.

Each stud holder has at its lower end a pair of stud holding dogs 240 (FIGURES 10 and 11) respectively supported on horizontal pivots 241 in diametrically opposed slots 242. Springs 243 normally urge the dogs about their pivots in a direction to move the lower ends of the dogs toward each other to a position in which the inner surfaces 244 of the dogs engage the radially inner surfaces of the slots 242 at which time the shoulders 245 on the lower ends of the dogs project beneath the reduced portion 233 within the stud holder. A stud admitted to one of the stud holders will immediately drop through the reduced tubular portion 233 and become suspended with its head engaged and supported by the shoulders 245 of the dogs 240 (FIGURE 13).

Each stud inserting device also includes a plunger 250 which is vertically reciprocable within the associated stud holder 231. Each plunger is closely received in the associated stud holder and has a reduced cylindrical portion 251 at the lower end adapted to be slidably received in the reduced tubular portion 233 at the lower end of the associated holder. Each plunger 250 is connected to the rod 252 of a piston 253 reciprocable within a bore 254 in the hydraulic piston-cylinder assembly 255 vertically disposed above the guide block 227 and rigidly secured to a frame member 256. A coupling 257 is provided for connecting each plunger to one of the connecting rods 252. Each of the pistons 253 is reciprocable within a bore 254 in the cylinder 259 of the assembly 255, and the upper ends of the bores 254 communicate with each other and with the hydraulic fluid port 260. The lower ends of the bores communicate with each other and with the fluid port 261. Hydraulic fluid is delivered to and exhausted from ports 260 and 261 by lines 262 and 263 through 4-way valve 264. Hydraulic fluid under pressure is supplied to line 265 from a suitable source, and 266 is an exhaust line.

Each plunger 250 has a transverse elongated slot 267 which slidably receives a pin 268 secured to and extending across the upper end of the associated stud holder. A coil spring 269 surrounds each plunger 250 and is adapted to be compressed between the collar 232 of the associated stud holder and the coupling 257.

The pistons 253 are capable of reciprocating the plungers 250 from an upper position illustrated in FIGURE 8 to a lower position illustrated in FIGURE 3. In the upper position of FIGURE 8, the stud holder 231 is held up in a position with its lateral port 234 aligned with the opening 238 in the liner by reason of the pin 268 being suspended in the bottom of the slot 267. The stud holder is also held in the FIGURE 8 position after initial downward movement of the plunger. This is accomplished by the threaded detent 270 threadedly engaged in the passage 271 in the guide block 227. A detent 270 (FIGURE 5) is provided for each stud holder and each has a spring pressed tip 272 engageable with the lower end of the stud holder to hold it up. When the plunger reaches the FIGURE 9 position and begins to compress the spring 269, the tip 272 will be cammed inwardly to clear the stud holder and the stud holder and plunger then move as a unit to the FIGURE 3 position whereupon the collar 232 of the stud holder engages the guide block. Continued movement of the plunger will eject the stud from the dogs 240, spreading the latter apart and the stud is then pressed into assembled relation with the hub flange and drum back through the registering openings 55 and 58. The enlarged intermediate portion 70 of the stud is staked by the sleeves 61 and 82 to secure the parts of the hub and drum assembly together.

Since each piston 253 of the assembly 255 is exposed to the hydraulic fluid under pressure entering port 260, the pistons are independent of one another and each plunger is assured of bringing to bear sufficient pressure to insert the stud.

Each stud holder has an elongated axially extending slot 280 in its side, and a pin 281 threaded into the guide block 227 extends into the slot 280 to guide the vertical reciprocation of the stud holder. The block 282 is located below a work support 4 on the turntable 2 in an indexed position thereof and is normally spaced beneath the supporting member 20 thereof. The block 282 serves as an anvil to back up the supporting member 20 when the stud inserting mechanism is operated.

The operation of the stud inserting mechanism will be explained in connection with the control schematic of FIGURE 15. A limit switch LS-2 shown in FIGURE 1 is operated by locking pin 92 of locking device 90 as a support 4 comes into registration with stud inserting mechanism 225. The turntable is locked in indexed position by advance of the locking pin 92 which engages a registering recess 94 in the table, and the limit switch is operated by the locking pin during advance thereof. Alternatively switch LS-2 may be hand operated.

Switch LS-2 has contact LS-2B which momentarily closes when limit switch LS-2 is momentarily closed to energize relay C closing contacts C-1 and C-2 of the relay. Contact C-1 seals in the relay and contact C-2 energizes solenoid S-4 (FIGURE 8). As a result, the 4-way valve 264 is shifted from its normal position to a position directing hydraulic fluid under pressure from line 265 to the upper end of assembly 255 and exhausting the lower end of the assembly. As a result, the plungers 250 of the stud inserting devices 225 are moved downwardly to an intermediate position shown in FIGURE 9 and thereafter the stud holder 231 moves downwardly as a unit with the plunger through the action of the spring 269. Each stud holder continues to advance until its collar 232 engages the guide block 227. The stud 70 supported by the dogs 240 (FIGURE 13) is thereafter ejected by the continued advance of plunger 250 and forced under pressure into the registering openings 55 and 58 in the drum back and hub flange. Sufficient pressure is brought to bear on the studs to cause the knurled portions thereof to have a pressed fit with the openings 58 in the hub flange and to stake the studs to the underside of the drum back. A pressure switch PS-3 in line 262 momentarily opens when a predetermined pressure is reached to de-energize the relay C and hence solenoid S-4 permitting the 4-way valve 264 to assume its normal position in which it directs hydraulic fluid under pressure to the lower end of the assembly 255 and exhausts the upper end to retract the stud inserting devices 226 to the upper limiting position of FIGURE 8 thereby allowing studs 70 to enter the stud inserting devices from tubes 235 preparing the mechanism for another cycle of operation.

During insertion of the studs, supporting member 20 is moved downwardly by the inserting pressure against anvil 282. Normally the supporting members 20 are elevated clear of the anvil by springs 28 in order not to interfere with table indexing.

What I claim as my invention is:

1. Apparatus for inserting a stud in a hole comprising a support for a workpiece having the hole, an elongated tubular stud holder aligned with the hole, means guiding said holder for axial reciprocation toward and away from the hole between inner and outer limits, a stop determining said inner limit, a stud chute, a port in the side of said holder in register with the outlet of said stud chute in the outer limit of said holder, yieldable means on said holder for holding a stud received from said chute, a plunger reciprocable within said holder and having a lost-motion connection therewith, means for retracting said plunger away from the hole to an outer limit clearing said port and, through said lost-motion connection, retracting said holder to its outer limit, means for advancing said plunger toward said hole, means between said plunger and holder for advancing said holder with said plunger to its inner limit determined by said stop and yieldable to permit further advance of said plunger relative to said holder sufficient to eject the stud from said holder and force it into the hole under pressure.

2. Apparatus as in claim 1 in which said last-mentioned means includes a coil spring encircling said plunger between a collar thereon and the outer end of said holder.

3. Apparatus as in claim 2 including yieldable means for holding said holder retracted prior to and during the initial advance of said plunger.

4. Apparatus as in claim 3 having yieldable means normally holding said support in a predetermined position, the pressure of insertion of the stud in the hole being sufficient to move said support away from said predetermined position against the action of said yieldable means, and means providing a positive abutment limiting further movement of said support away from said predetermined position to insure that the full pressure of said plunger is applied to the stud.

5. Apparatus for inserting a stud in a hole comprising a support for a workpiece having the hole, an elongated tubular stud holder aligned with the hole of the workpiece carried by said support, means guiding said holder for axial reciprocation toward and away from the hole between inner and outer limits, a stop determining said inner limit, yieldable means on said holder for holding a stud, a plunger reciprocable within said holder and having a lost-motion connection therewith, means for retracting said plunger away from the hole to an outer limit and, through said lost-motion connection, retracting said holder to its outer limit, means for advancing said plunger toward said hole, means between said plunger and holder for advancing said holder with said plunger to its inner limit determined by said stop and yieldable to permit further advance of said plunger relative to said holder sufficient to eject the stud from said holder and force it into the hole under pressure.

6. Apparatus for inserting a stud in a hole comprising a generally horizontal turntable, a vertically movable support for a workpiece having the hole carried by said turntable, resilient means normally holding said support in an upper limiting position, a fixed anvil beneath said turntable and registrable with said support in spaced relation therebeneath in a predetermined position of said turntable, an elongated tubular stud holder in vertical alignment with the hole, means guiding said holder for axial reciprocation toward and away from the hole between inner and outer limits, a stop determining said inner limit, a stud chute, a port in the side of said holder in register with the outlet of said stud chute in the outer limit of said holder, yieldable means on said holder for holding a stud received from said chute, a plunger reciprocable within said holder and having a lost-motion connection therewith, means for retracting said plunger away from the hole to an outer limit clearing said port and, through said lost motion connection, retracting said holder to its outer limit, means for advancing said plunger toward said hole, means between said plunger and holder for advancing said holder with said plunger to its inner limit determined by said stop and yieldable to permit further advance of said plunger relative to said holder sufficient to eject the stud from said holder and to force it into the hole under sufficient pressure to move said support downwardly toward said anvil against the action of said resilient means, said means between said plunger and holder including a collar on said plunger and a coil spring encircling said plunger between said collar and the outer end of said holder, said anvil providing a positive abutment limiting further downward movement of said support to insure that the full pressure of said plunger is applied to the stud, and yieldable means for holding said holder retracted prior to and during the initial advance of said plunger.

7. Apparatus for inserting a stud in a hole comprising a carrier movable along a predetermined path, a support for a workpiece having the hole mounted on the carrier, a fixed anvil supported at one side of said path, a stud inserting member supported at the opposite side of said path in opposed relation to said anvil for movement toward said anvil in a direction transversely of said path, means for moving said carrier along said path and stopping the same with said support at a working station directly between said member and said anvil, means mounting said support on said carrier for movement in the direction of movement of said stud inserting member, resilient means normally holding said support in a position relative to said carrier clearing said anvil, means for moving said stud inserting member toward said anvil when said support is located at said working station for inserting a stud into the hole under sufficient pressure to move said support into contact with said anvil against the action of said resilient means, said anvil providing a nonyielding abutment for said support to insure that the full inserting pressure of said member is applied to the stud.

8. Apparatus for inserting a stud in a hole comprising a support for a workpiece having a hole, means for positioning said support at a work station, a member mounted adjacent said work station in axial alignment with the hole in the workpiece on said support, means for moving said member toward the hole in the workpiece on said support along the axis of the hole for axially inserting a stud into the hole, a guide pin normally extending into said hole and axially movable out of the hole by the stud during insertion thereof, and spring means opposing such axial movement of said pin, said pin serving to guide the stud into the hole.

References Cited in the file of this patent
UNITED STATES PATENTS

| | | |
|---|---|---|
| 1,402,901 | Shaw | Jan. 10, 1922 |
| 1,482,687 | Kraft | Feb. 5, 1924 |
| 1,677,860 | Ferris | July 17, 1928 |
| 2,533,870 | Bayer | Dec. 12, 1950 |
| 2,604,692 | Broden | July 29, 1952 |
| 2,698,478 | Heisterkamp | Jan. 4, 1955 |